US 12,535,213 B2

United States Patent
Singh et al.

(10) Patent No.: US 12,535,213 B2
(45) Date of Patent: Jan. 27, 2026

(54) WAVY ANNULAR DILUTION SLOTS FOR LOWER EMISSIONS

(71) Applicant: General Electric Company, Schenectady, NY (US)

(72) Inventors: Saket Singh, Bengaluru (IN); Pradeep Naik, Bengaluru (IN); Rimple Rangrej, Bengaluru (IN); Ranganatha Narasimha Chiranthan, Bengaluru (IN); Krishnendu Chakraborty, Bengaluru (IN); Shai Birmaher, Cincinnati, OH (US)

(73) Assignee: GENERAL ELECTRIC COMPANY, Evendale, OH (US)

(*) Notice: Subject to any disclaimer, the term of this patent is extended or adjusted under 35 U.S.C. 154(b) by 0 days.

(21) Appl. No.: 18/435,033

(22) Filed: Feb. 7, 2024

(65) Prior Publication Data

US 2025/0020323 A1   Jan. 16, 2025

Related U.S. Application Data

(62) Division of application No. 17/649,220, filed on Jan. 28, 2022, now Pat. No. 11,920,790.

(30) Foreign Application Priority Data

Nov. 3, 2021   (IN) .............................. 202111050494

(51) Int. Cl.
   *F23R 3/00*   (2006.01)
   *F23R 3/04*   (2006.01)
   (Continued)

(52) U.S. Cl.
   CPC ................ *F23R 3/002* (2013.01); *F23R 3/04* (2013.01); *F23R 3/06* (2013.01); *F23R 3/10* (2013.01)

(58) Field of Classification Search
   CPC .... F23R 3/002; F23R 3/04; F23R 3/06; F23R 3/10
   See application file for complete search history.

(56) References Cited

U.S. PATENT DOCUMENTS 2,840,989 A   7/1958   Wallace
3,767,122 A   10/1973   Sedgwick
(Continued)

FOREIGN PATENT DOCUMENTS

CN   102373964 A   3/2012
WO   2013/184502 A1   12/2013

*Primary Examiner* — Lindsay M Low
*Assistant Examiner* — Henry Ng
(74) *Attorney, Agent, or Firm* — Venable LLP; Edward A. Kmett; Michele V. Frank

(57) ABSTRACT

A combustor liner for a combustor of a gas turbine includes an outer liner having a plurality of outer liner segments, and an inner liner having a plurality of inner liner segments. Each segment of the inner liner and the outer liner includes at least one slotted dilution opening therethrough extending in a circumferential direction, and each slotted dilution opening includes a deflector wall extending radially from the respective liner into a dilution zone of a combustion chamber between the outer liner and the inner liner. The at least one slotted dilution opening may be a curved slot (either concave or convex) dilution opening, and the curved slot dilution openings for each segment of the outer liner and the inner liner may be connected so as to provide a wavy slotted dilution opening extending annularly through the outer liner and the inner liner.

18 Claims, 11 Drawing Sheets

(51) Int. Cl.
    *F23R 3/06*     (2006.01)
    *F23R 3/10*     (2006.01)

(56) References Cited

U.S. PATENT DOCUMENTS

| | | |
|---|---|---|
| 4,622,821 A | 11/1986 | Madden |
| 4,653,279 A | 3/1987 | Reynolds |
| 5,488,829 A | 2/1996 | Southall et al. |
| 7,805,944 B2 | 10/2010 | Garry et al. |
| 7,891,194 B2 | 2/2011 | Biebel et al. |
| 8,109,099 B2 | 2/2012 | Tu et al. |
| 8,151,570 B2 | 4/2012 | Jennings et al. |
| 8,176,739 B2 | 5/2012 | Evulet et al. |
| 9,097,424 B2 | 8/2015 | Chen et al. |
| 10,823,418 B2 | 11/2020 | Zelina et al. |
| 10,995,956 B2 | 5/2021 | Kajimura et al. |
| 11,371,701 B1 | 6/2022 | Gandikota et al. |
| 11,578,868 B1 | 2/2023 | Chakraborty et al. |
| 2007/0128029 A1 | 6/2007 | Liang |
| 2017/0045226 A1 | 2/2017 | Cheung et al. |
| 2018/0283689 A1* | 10/2018 | Wang ................ F23R 3/06 |
| 2018/0286389 A1 | 10/2018 | Kawachi et al. |
| 2019/0024895 A1 | 1/2019 | Stickles et al. |
| 2019/0249874 A1 | 8/2019 | Gandikota et al. |
| 2019/0277501 A1 | 9/2019 | Xu |
| 2020/0158342 A1 | 5/2020 | Boardman et al. |
| 2020/0333008 A1 | 10/2020 | Ribassin et al. |
| 2022/0364510 A1 | 11/2022 | Gandikota et al. |

\* cited by examiner

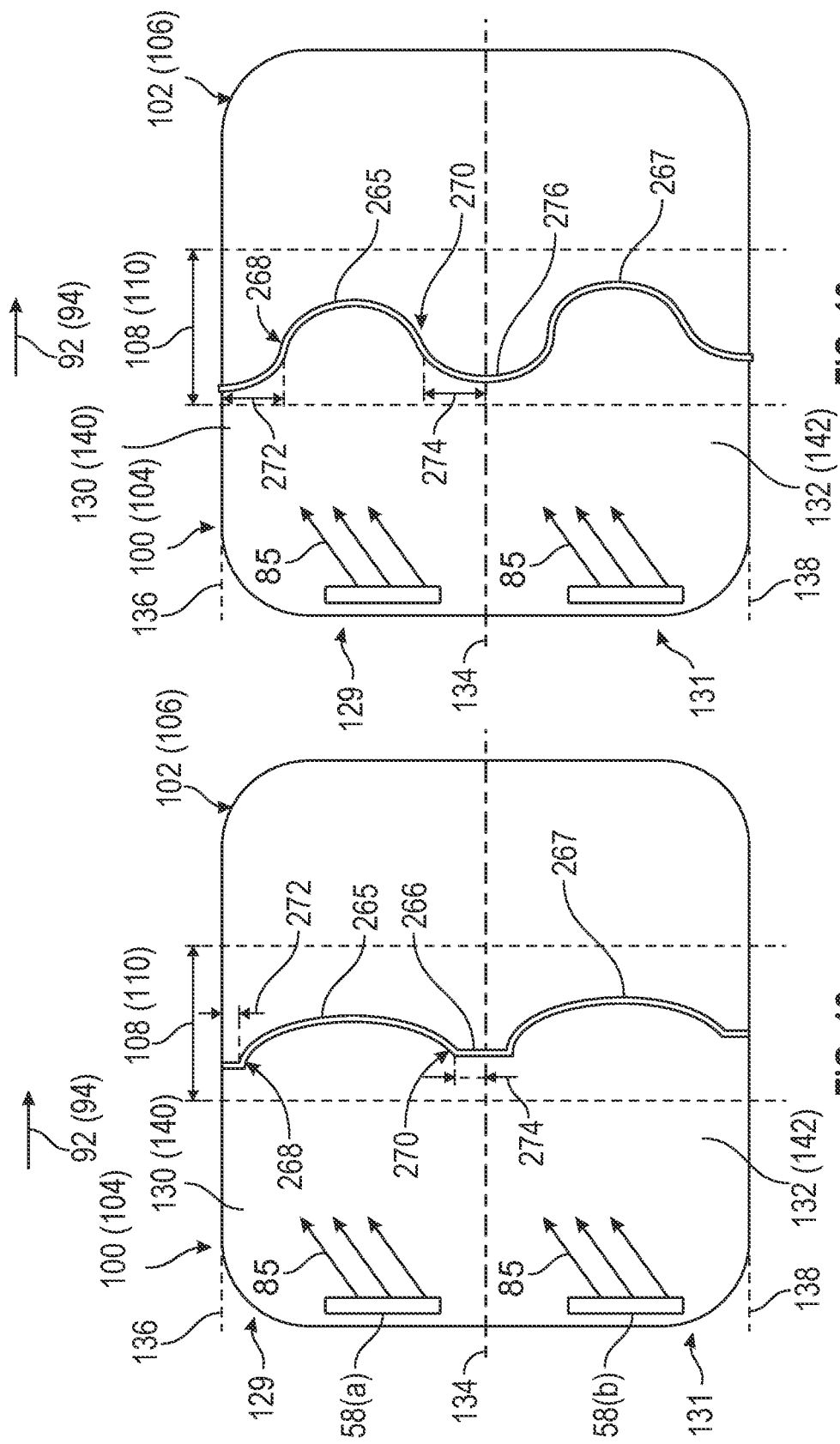

WAVY ANNULAR DILUTION SLOTS FOR LOWER EMISSIONS

CROSS REFERENCE TO RELATED APPLICATIONS

This application is a divisional of U.S. patent application Ser. No. 17/649,220 filed on Jan. 28, 2022, which claims priority to Indian Patent Application No. 202111050494, filed on Nov. 3, 2021, the entire contents of which are hereby incorporated by reference in their entireties.

TECHNICAL FIELD

The present disclosure relates to a dilution of combustion gases in a combustion chamber of a gas turbine engine.

BACKGROUND

In conventional gas turbine engines, it has been known to provide a flow of dilution air into a combustion chamber downstream of a primary combustion zone. Conventionally, an annular combustor liner may include both an inner liner and an outer liner forming a combustion chamber between them. The inner liner and the outer liner may include dilution holes through the liners that provide a flow of air (i.e., a dilution jet) from a passage surrounding the annular combustor liner into the combustion chamber. Some applications have been known to use circular holes for providing dilution air flow to the combustion chamber. The flow of air through the circular dilution holes in the conventional combustor mixes with combustion gases within the combustion chamber to provide quenching of the combustion gases. High temperature regions seen behind the dilution jet (i.e., in the wake region of dilution jet) are associated with high NOx formation. In addition, the circular dilution air jet does not spread laterally, thereby creating high temperatures in-between dilution jets that also contribute to high NOx formation.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 12 depicts a plan view of a first segment outer liner and a second segment outer liner connection, according to an aspect of the present disclosure.

FIG. 13 depicts a plan view of a first segment outer liner and a second segment outer liner connection, according to another aspect of the present disclosure.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Various embodiments are discussed in detail below. While specific embodiments are discussed, this is done for illustration purposes only. A person skilled in the relevant art will recognize that other components and configurations may be used without departing from the spirit and scope of the present disclosure.

In a combustion section of a turbine engine, air flows through an outer passage surrounding a combustor liner, and through an inner passage surrounding the combustor liner. The air generally flows from an upstream end of the combustor liner to a downstream end of the combustor liner. Some of the airflow in both the outer passage and the inner passage is diverted through dilution holes in the combustor liner and into the combustion chamber as dilution air. One purpose of the dilution airflow is to cool (i.e., quench) combustion gases within the combustion chamber before the gases enter a turbine section. However, quenching of the product of combustion from the primary zone must be done quickly and efficiently so that regions of high temperature can be minimized, and thereby NOx emissions from the combustion system can be reduced.

The present disclosure aims to reduce the NOx emissions by improving the dilution quenching of the hot combustion gases from the primary combustion zone. According to the present disclosure, a combustor liner includes at least one curved, or wavy dilution opening that has a deflector wall extending into the combustion chamber at a downstream side of the dilution opening. The curved, or wavy, dilution opening may extend circumferentially through the liner about the entire circumference of the liner, or may include curved segments or wavy segments extending through various liner segments, where the liner segments together for an annular type liner. The curved dilution openings or wavy dilution openings introduce the dilution air into the combustion chamber at different axial locations about the circumference of the liner in order to improve mixing for zones with closer equivalence ratios.

Figure 1:
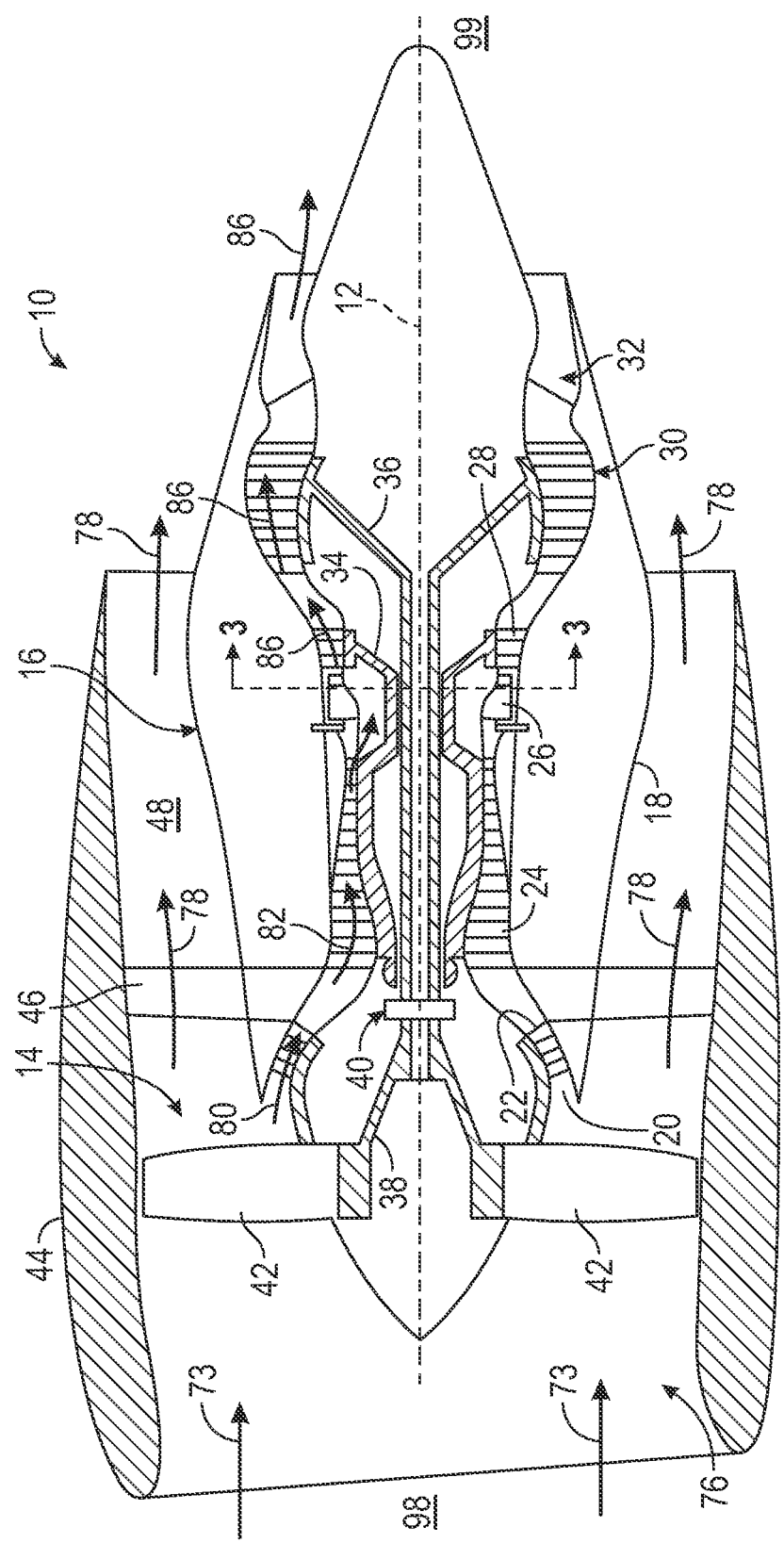
FIG. 1 is a schematic partially cross-sectional side view of an exemplary high by-pass turbofan jet engine, according to an embodiment of the present disclosure.

Referring now to the drawings, FIG. 1 is a schematic partially cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, engine 10 has a longitudinal or axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section, including a high pressure (HP) turbine 28, a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive configuration or a geared-drive configuration. In other embodiments, although not illustrated, the engine 10 may further include an intermediate pressure (IP) compressor and a turbine rotatable with an intermediate pressure shaft.

As shown in FIG. 1, the fan assembly 14 includes a plurality of fan blades 42 that are coupled to and that extend radially outwardly from the fan shaft 38. An annular fan casing, or nacelle 44, circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16, so as to define a bypass airflow passage 48 therebetween.

Figure 2:
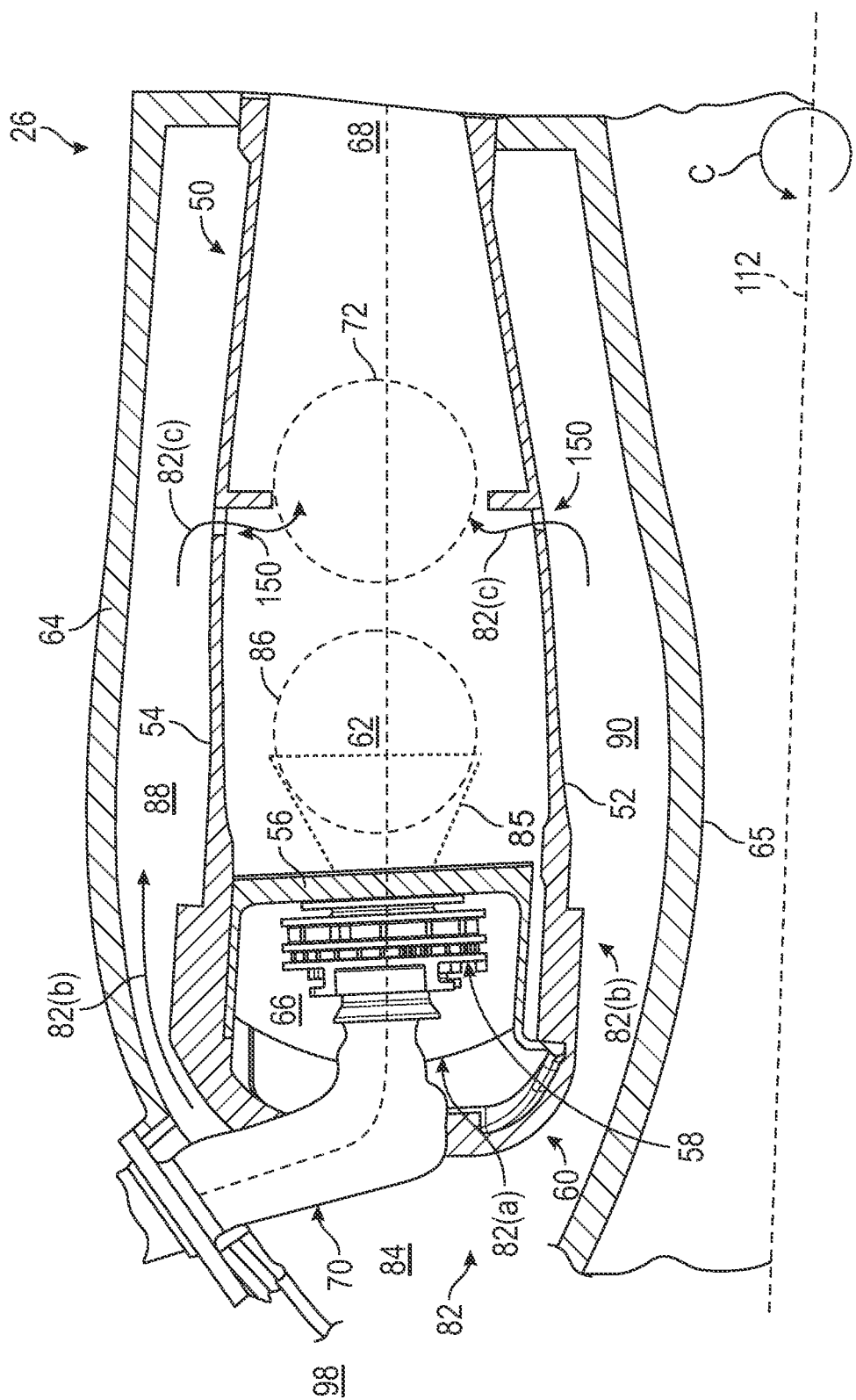
FIG. 2 is a cross-sectional side view of an exemplary combustion section, according to an embodiment of the present disclosure.

FIG. 2 is a cross-sectional side view of an exemplary combustion section 26 of the core engine 16 as shown in FIG. 1. As shown in FIG. 2, the combustion section 26 may generally include a combustor liner 50 having an inner liner 52, an outer liner 54, a cowl 60, and a dome assembly 56. The inner liner 52, the outer liner 54, and the dome assembly 56 together define a combustion chamber 62. The combustion chamber 62 may more specifically define various regions, including a primary combustion zone at which initial chemical reaction of a fuel-oxidizer mixture and/or recirculation of combustion gases 86 may occur before flowing further downstream to a dilution zone 72, where mixture and/or recirculation of the combustion gases 86 and air may occur before flowing into HP and LP turbines 28, 30. The dome assembly 56 extends radially between the outer liner 54 and the inner liner 52.

As shown in FIG. 2, the inner liner 52 may be encased within an inner casing 65 and the outer liner 54 may be encased within an outer casing 64. An outer flow passage 88 is defined between the outer casing 64 and the outer liner 54, and an inner flow passage 90 is defined between the inner casing 65 and the inner liner 52. The inner liner 52 may include a plurality of curved slot dilution openings 150 (to be described in more detail below), and the outer liner 54 may also include a plurality of curved slot dilution openings 150. As will be described in more detail below, the curved slot dilution openings 150 provide a flow of compressed air 82(c) therethrough and into the dilution zone 72 of the combustion chamber 62. The flow of compressed air 82(c) can thus be utilized to provide quenching of the combustion gases 86 in the dilution zone 72 so as to cool the flow of combustion gases 86 entering the turbine section.

During operation of the engine 10, as shown in FIGS. 1 and 2 collectively, a volume of air 73, as indicated schematically by arrows, enters the engine 10 from upstream end 98 through an associated inlet 76 of the nacelle 44 and/or fan assembly 14. As the volume of air 73 passes across the fan blades 42, a portion of the air, as indicated schematically by arrows 78, is directed or routed into the bypass airflow passage 48, while another portion of the air 80, as indicated schematically by an arrow, is directed or routed into the LP compressor 22. Air 80 is progressively compressed as it flows through the LP compressor 22 and the HP compressor 24 towards the combustion section 26. Referring to FIG. 2, the now compressed air 82, as indicated schematically by an arrow, flows into a diffuser cavity 84 of the combustion section 26 and pressurizes the diffuser cavity 84. A first portion of the compressed air 82, as indicated schematically by arrows, compressed air 82(a) flows from the diffuser cavity 84 into a pressure plenum 66, where it is then swirled by and mixed with fuel, provided by fuel nozzle assembly 70, by a swirler assembly 58 to generate a swirled fuel-air mixture 85 that is then ignited and burned to generate the combustion gases 86. A second portion of the compressed air 82, as indicated schematically by arrows, compressed air 82(b) may be used for various purposes other than combustion. For example, as shown in FIG. 2, compressed air 82(b) may be routed into the outer flow passage 88 and into the inner flow passage 90. A portion of the compressed air 82(b) may then be routed through the curved slot dilution opening 150 (schematically shown as compressed air 82(c)) and into the dilution zone 72 of combustion chamber 62 to provide quenching of the combustion gases 86 in dilution zone 72. The compressed air 82(c) may also provide turbulence to the flow of combustion gases 86 so as to provide better mixing of the compressed air 82(c) with the combustion gases 86. A similar flow of the compressed air 82(c) from the inner flow passage 90 through the curved slot dilution opening 150 of the inner liner 52 occurs. In addition, or in the alternative, at least a portion of compressed air 82(b) may be routed out of the diffuser cavity 84. For example, a portion of compressed air 82(b) may be directed through various flow passages (not shown) to provide cooling air to at least one of the HP turbine 28 or the LP turbine 30.

Referring back to FIGS. 1 and 2 collectively, the combustion gases 86 generated in the combustion chamber 62 flow from the combustion section 26 via a turbine inlet 68 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsion at downstream end 99.

Figure 3:
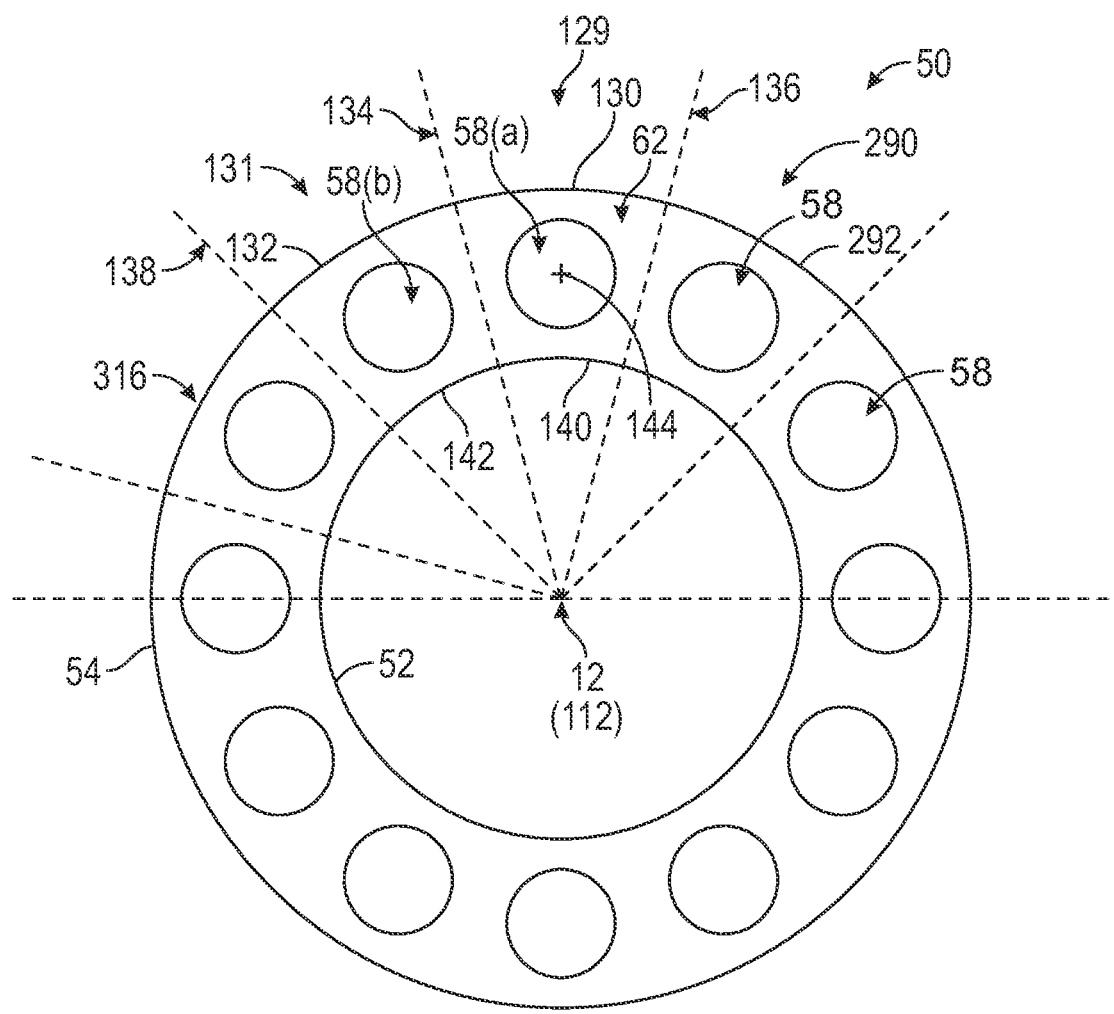
FIG. 3 depicts a partial cross-sectional view of a combustor liner, taken at plane 3-3 of FIG. 1, according to an embodiment of the present disclosure.

FIG. 3 is a partial cross-sectional view of a combustor liner 50 taken at plane 3-3 shown in FIG. 1. As seen in FIG. 3, the combustor liner 50 is a generally annular liner that extends circumferentially about the centerline axis 12 of the engine 10. As it may relate to the combustor liner 50, the centerline axis 12 may also correspond to a combustor centerline 112. The combustor liner 50 includes the outer liner 54 and the inner liner 52. Representative swirler assemblies 58 are shown as being circumferentially spaced about the combustor centerline 112. With respect to each swirler assembly 58, a portion of the combustor liner 50 may be considered as a segment of the combustor liner 50. That is, the combustor liner 50 may be considered to include multiple segments (e.g., a first combustor liner segment 129 and a second combustor liner segment 131) circumferentially about the combustor centerline 112, where each segment corresponds to a respective swirler assembly 58. For example, the first combustor liner segment 129 may be associated with a first segment swirler assembly 58(a), and may be defined between a segment boundary line 134 and a segment boundary line 136, which extend radially outward from combustor centerline 112 and may be equally angularly spaced apart from a center 144 of the first segment swirler assembly 58(a). Similarly, the second combustor liner segment 131 may be associated with the second segment swirler assembly 58(b), and may be defined between segment boundary line 134 and a segment boundary line 138. The second combustor liner segment 131 is adjacent to the first combustor liner segment 129. The first combustor liner segment 129 includes a first segment outer liner 130 and a first inner liner segment 140, while the second combustor liner segment 131 includes a second segment outer liner 132 and a second inner liner segment 142. Of course, both the outer liner 54 and the inner liner 52 may be formed as one continuous annular liner rather than multiple segments that are joined together, but, for the purposes of the discussion below relating to the dilution openings, both the outer liner 54 and the inner liner 52 will be considered to be segmented.

Figure 4:
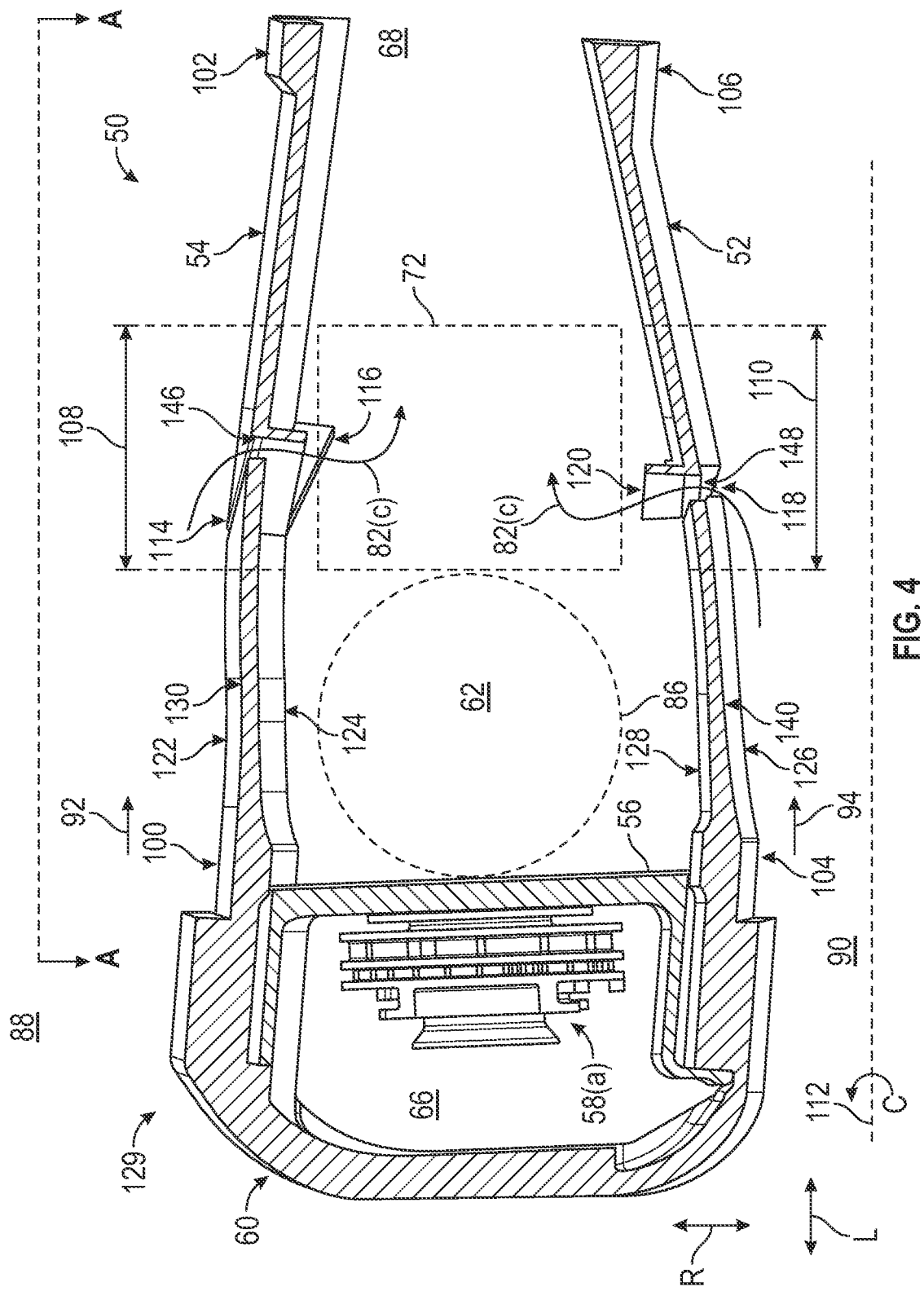
FIG. 4 depicts a partial cross-sectional side view of an exemplary combustor liner, according to an aspect of the present disclosure.
Figure 5:
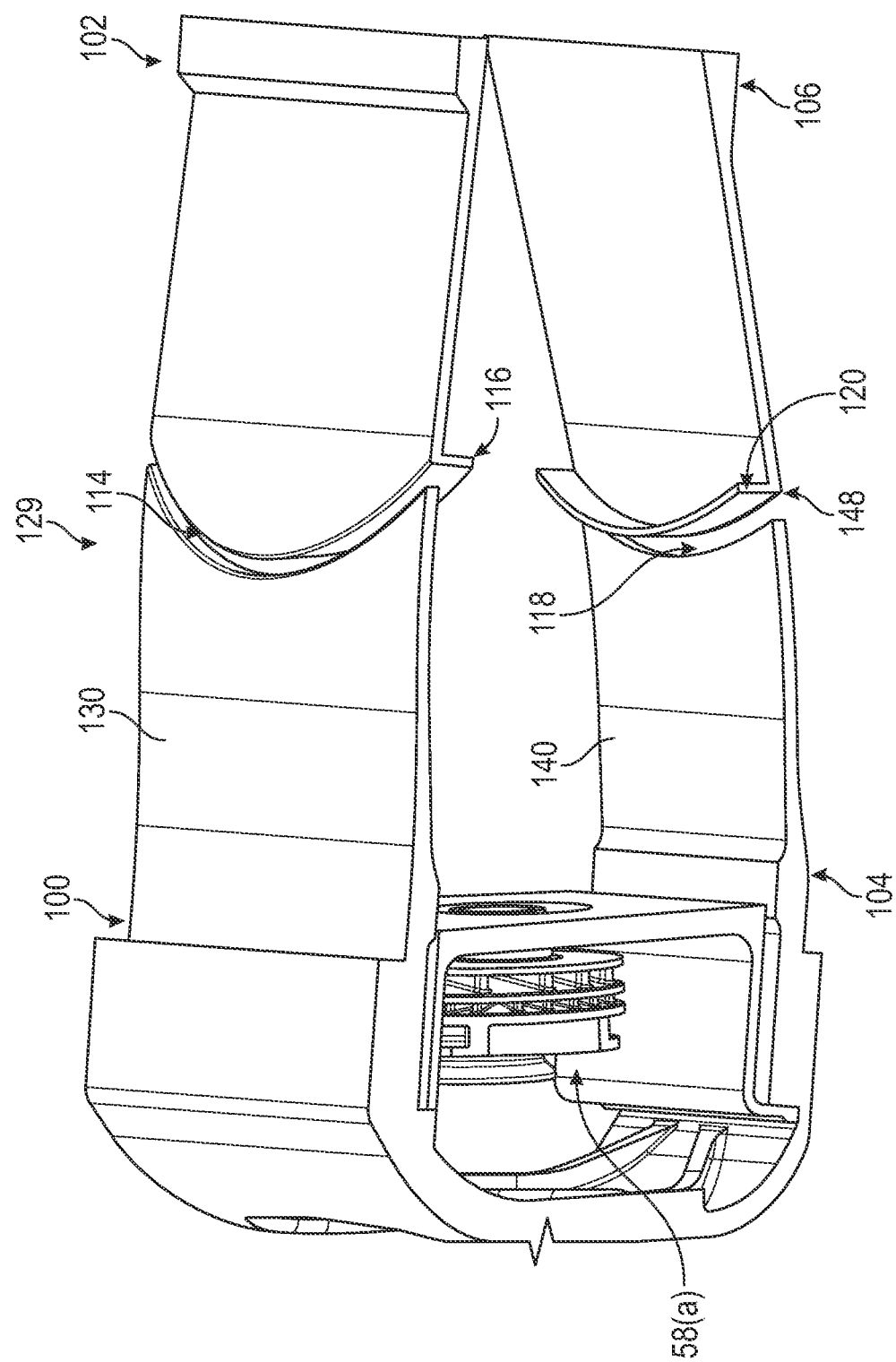
FIG. 5 depicts a top perspective view of an exemplary combustor liner, according to an aspect of the present disclosure.

FIG. 4 depicts a partial cross-sectional view of a segment of the combustor liner 50, according to an aspect of the present disclosure. FIG. 5 is a perspective view of the segment of the combustor liner 50 shown in FIG. 4. The segment of the combustor liner 50 shown in FIGS. 4 and 5 may correspond to, for example, the first combustor liner segment 129. In FIGS. 4 and 5, the first segment swirler assembly 58(a) is depicted merely for reference purposes. Referring to FIG. 4, the combustor liner 50 defines an axial direction (L), which may be parallel to the combustor centerline 112, a radial direction (R), which extends generally perpendicular to the combustor centerline 112, and a circumferential direction (C) about a combustor centerline 112. The combustor liner 50 includes the outer liner 54 that, as described above, includes a plurality of outer liner segments (e.g., first segment outer liner 130 and second segment outer liner 132 (FIG. 3)) connected together so as to extend annularly about the combustor centerline 112. The first segment outer liner 130 extends from an outer liner upstream end 100 to an outer liner downstream end 102 and includes an outer liner dilution zone 108 between the outer liner upstream end 100 and the outer liner downstream end 102. The first segment outer liner 130 has an outer liner cold surface side 122 adjacent to the outer flow passage 88, and an outer liner hot surface side 124 adjacent to the combustion chamber 62. As was described above, a portion of the compressed air 82(b) flows in the outer flow passage 88, and the compressed air 82(b) flows from the outer liner upstream end 100 toward the outer liner downstream end 102, thereby defining an outer flow direction 92 that extends in the axial direction (L). The first segment outer liner 130 further includes at least one first segment outer liner slotted dilution opening 114 therethrough in the outer liner dilution zone 108. Various arrangements of the first segment outer liner slotted dilution opening 114 will be described in more detail below. In FIGS. 4 and 5, however, the first segment outer liner slotted dilution opening 114 is shown as a curved slot opening (FIG. 5), which will be described in more detail below. The first segment outer liner 130 is further seen to include a first segment outer liner deflector wall 116 extending radially inward from the outer liner hot surface side 124 adjacent to a downstream side 146 of the first segment outer liner slotted dilution opening 114. The first segment outer liner deflector wall 116 generally follows the contour of the downstream side 146 of the first segment outer liner slotted dilution opening 114. Various arrangements of the first segment outer liner deflector wall 116 will be described in more detail below. With the first segment outer liner slotted dilution opening 114, and the first segment outer liner deflector wall 116, a portion (shown schematically as compressed air 82(c)) of the compressed air 82(b) flowing in the outer flow passage 88 flows through the first segment outer liner slotted dilution opening 114 and is deflected or guided by the first segment outer liner deflector wall 116 radially inward into the dilution zone 72 of the combustion chamber 62. While the term deflector wall may be utilized herein, it is noted that the deflector wall 116 acts as a fence for hot gases flowing within the combustion chamber 62, and also acts as a guide or support wall for guiding a flow of the compressed air 82(c) through the first segment outer liner slotted dilution opening 114 into the combustion chamber 62. Thus, the deflector wall 116 may not necessarily merely deflect the hot gases or the air 82(c), but rather, may act as a guide for the flow of each instead.

The combustor liner 50 also includes the inner liner 52 that, as described above, includes a plurality of inner liner segments (e.g., first inner liner segment 140 and second inner liner segment 142 (FIG. 3)) connected together so as to extend annularly about the combustor centerline 112. The first inner liner segment 140 extends from an inner liner upstream end 104 to an inner liner downstream end 106, and includes an inner liner dilution zone 110 between the inner liner upstream end 104 and the inner liner downstream end 106. The first inner liner segment 140 has an inner liner cold surface side 126 adjacent to the inner flow passage 90, and an inner liner hot surface side 128 adjacent to the combustion chamber 62. As was described above, a portion of the compressed air 82(b) flows in the inner flow passage 90, and the compressed air 82(b) flows from the inner liner upstream end 104 toward the inner liner downstream end 106, thereby defining an inner liner flow direction 94 that extends in the axial direction (L). The first inner liner segment 140 further includes at least one first segment inner liner slotted dilution opening 118 therethrough in the inner liner dilution zone 110. Various arrangements of the first segment inner liner slotted dilution opening 118 will be described in more detail below. In FIG. 4, however, the first segment inner liner slotted dilution opening 118 is shown as a curved slot opening, which will be described in more detail below. The first inner liner segment 140 is further seen to include a first segment inner liner deflector wall 120 extending radially outward from the inner liner hot surface side 128 adjacent to a downstream side 148 of the first segment inner liner slotted dilution opening 118. As seen in FIG. 5, the first segment inner liner deflector wall 120 generally follows the contour of the downstream side 148 of the first segment inner liner slotted dilution opening 118. Various arrangements of the first segment inner liner deflector wall 120 will be described in more detail below. As seen in FIG. 4, with the first segment inner liner slotted dilution opening 118, and the first segment inner liner deflector wall 120, a portion (shown schematically as compressed air 82(c)) of the compressed air 82(b) flowing in the inner flow passage 90 flows through the first segment inner liner slotted dilution opening 118 and is deflected by the first segment inner liner deflector wall 120 radially outward into the dilution zone 72 of the combustion chamber 62.

While the foregoing description related to the first combustor liner segment 129 of the combustor liner 50, it can be appreciated that the same arrangement of the first combustor liner segment 129 is applicable to the second combustor liner segment 131 of the combustor liner 50, and all other segments of the combustor liner 50.

Various arrangements of slotted dilution openings through the outer liner 54 and the inner liner 52 will now be described with regard to FIGS. 6 to 15. The following descriptions will be made with regard to slotted dilution openings through the outer liner 54, and, in particular, with regard to slotted dilution openings through the first segment outer liner 130, and, where applicable, the second segment outer liner 132. It can be appreciated, however, that the same slotted dilution openings described below are applicable to all remaining outer liner segments of the combustor liner 50. In addition, the same slotted dilution openings described below are applicable to the first inner liner segment 140, and where applicable, the second inner liner segment 142, as well as all other inner liner segments. Thus, a description of the remaining outer liner segments, and all of the inner liner segments, will be omitted for the sake of brevity.

Figure 6:
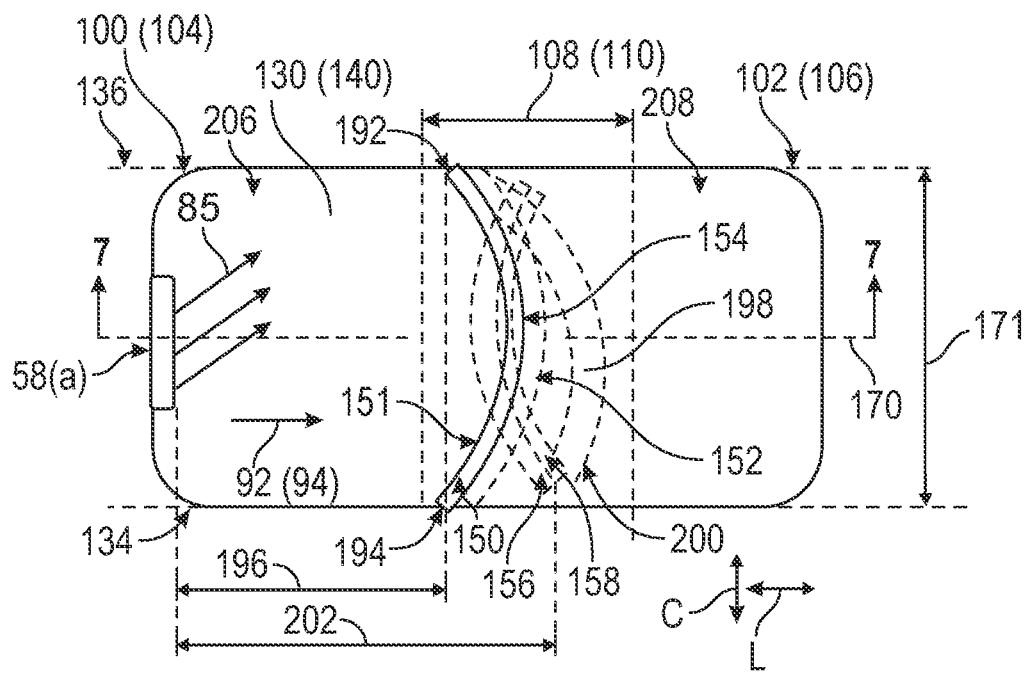
FIG. 6 depicts a plan view of a first segment outer liner, according to an aspect of the present disclosure.

FIG. 6 depicts a plan view of an exemplary first segment outer liner 130, taken at view A-A of FIG. 4. As seen in FIG. 6, the first segment outer liner 130 extends circumferentially between the segment boundary line 134 and the segment boundary line 136, and extends in the axial direction (L) from the outer liner upstream end 100 to the outer liner downstream end 102, and includes the outer liner dilution zone 108 therebetween. Within the outer liner dilution zone 108, a curved slot dilution opening 150 extends through the first segment outer liner 130. The curved slot dilution opening 150 extends in the circumferential direction (C) across the first segment outer liner 130 from the segment boundary line 134 to the segment boundary line 136. The curved slot dilution opening 150, however, may not extend completely across the width 171 of the first segment outer liner 130, but may instead extend partially across the width of the first segment outer liner 130 so as to form a curved slot dilution opening 150. In FIG. 6, the curved slot dilution opening 150 is shown to be formed as a concave curved slot dilution opening 151 with respect to the outer flow direction 92 or the inner flow direction 94. However, the curved slot dilution opening 150 may instead be formed as a convex curved slot dilution opening 156 with respect to the outer flow direction 92 or the inner flow direction 94. The curved slot dilution opening 150 includes a deflector wall 152 that, as seen by the hidden lines, generally follows the curved contour of a downstream side 154 of the curved slot dilution opening 150. A similar deflector wall 158, as seen by the hidden lines, may be provided to the convex curved slot dilution opening 156.

In FIG. 6, the curved slot dilution opening 150 is seen to be generally arranged symmetrical about a first segment centerline 170. For example, a first distance 196 from the outer liner upstream end 100 of the first segment outer liner 130 to a first end 192 of the curved slot dilution opening 150 and to a second end 194 of the curved slot dilution opening 150 is the same. On the other hand, an arrangement of a curved slot dilution opening 198 may be implemented in which a second end 200, as seen by the hidden lines, is downstream a second distance 202 from the first end 192 at the first distance 196. Thus, the curved slot dilution opening 198 may be skewed rather than being symmetrical about the first segment centerline 170.

Figure 7:
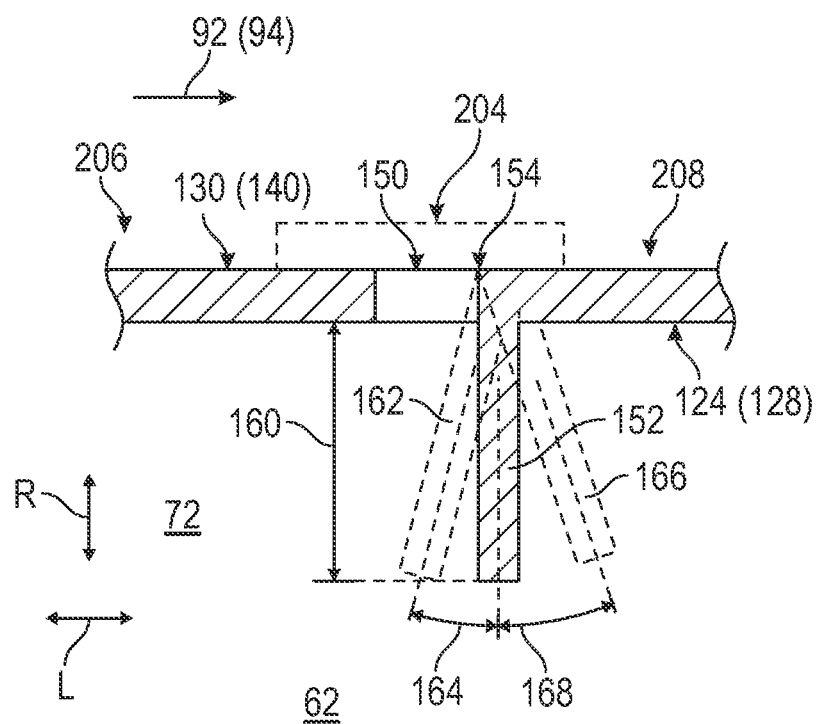
FIG. 7 depicts a partial cross-sectional side view of a curved dilution opening taken at plane 7-7 of FIG. 6, according to another aspect of the present disclosure.

FIG. 7 is a partial cross-sectional view of the curved slot dilution opening 150 and the deflector wall 152 taken at plane 7-7 of FIG. 6. While FIGS. 6 and 7 depict an arrangement for the first outer liner segment 130, it can be readily understood that a similar mirror image arrangement may be implemented in the first segment inner liner 140. Thus, the description of FIGS. 6 and 7, as well as the description of FIGS. 8 to 14, may be implemented in either or both of the outer liner 54 and/or the inner liner 52. As seen in FIG. 7, the deflector wall 152 extends in the radial direction radially inward from the outer liner hot surface side 124 into the dilution zone 72 of the combustion chamber 62 from the downstream side 154 of the curved slot dilution opening 150. For the first inner liner segment 140, the deflector wall 152 extends in the radial direction radially outward from the inner liner hot surface side 128 into the dilution zone 72 of the combustion chamber 62. A height 160 of the deflector wall 152 may be varied to obtain a desired amount of mixing of the compressed air 82(c) with the combustion gases 86 within the dilution zone 72. The deflector wall 152 shown in FIG. 7 is shown as generally being perpendicular to outer liner hot surface side 124 and the inner liner hot surface side 128, but the deflector wall 152 may be angled instead. For example, an upstream angled deflector wall 162, as seen by the hidden lines, may be angled in an upstream direction toward the outer liner upstream end 100 (or the inner liner upstream end 104) of the outer liner 54 (or the inner liner 52) at an outer/inner liner deflector wall upstream angle 164. Alternatively, a downstream angled deflector wall 166, as seen by the hidden lines, may be angled in a downstream direction toward the outer liner downstream end 102 (or the inner liner downstream end 106) of the outer liner 54 (or the inner liner 52) at a downstream angle 168. The outer/inner liner deflector wall upstream angle 164 may range from zero to fifty-five degrees in the upstream direction, while the downstream angle 168 may range from zero to forty-five degrees. Of course, upstream angle 164 and the downstream angle 168 are not limited to the foregoing ranges, and other angles may be implemented instead based on a desired amount of mixing to be achieved for the dilution air.

Also shown in FIG. 7 is a bridge member 204 that spans across the curved slot dilution opening 150. That is, in a case when the slotted dilution opening extends circumferentially across the first segment from segment boundary line 134 to the segment boundary line 136, and when the slotted dilution opening of each segment of the outer liner 54 is connected with the slotted dilution opening of adjacent segments, the outer liner 54 may be split axially into two sections: an outer liner upstream section 206 and an outer liner downstream section 208. The bridge member 204 is implemented to connect the two sections. For example, consider a case when each outer liner segment includes the curved slot dilution opening 150 of the FIG. 6 arrangement. In this case, the second end 194 of the curved slot dilution opening 150 in the first combustor liner segment 129 is aligned with and connects with a second end 194 of a curved slot dilution opening 150 in the second combustor liner segment 131, and so on, for each segment about the entire circumference of the outer liner 54. The connected curved slotted dilution openings 150 of each segment results in a separation of the outer liner into the outer liner upstream section 206 and the outer liner downstream section 208. Thus, to connect the outer liner upstream section 206 and the outer liner downstream section 208 together, a plurality of the bridge members 204 may be included about the circumference of the outer liner 54. For instance, with respect to the first combustor liner segment 129 and the second combustor liner segment 131, a bridge member 204 may be provided at the intersection of the two segments (i.e., at segment boundary line 134) across the curved slot dilution opening 150.

Figure 8:
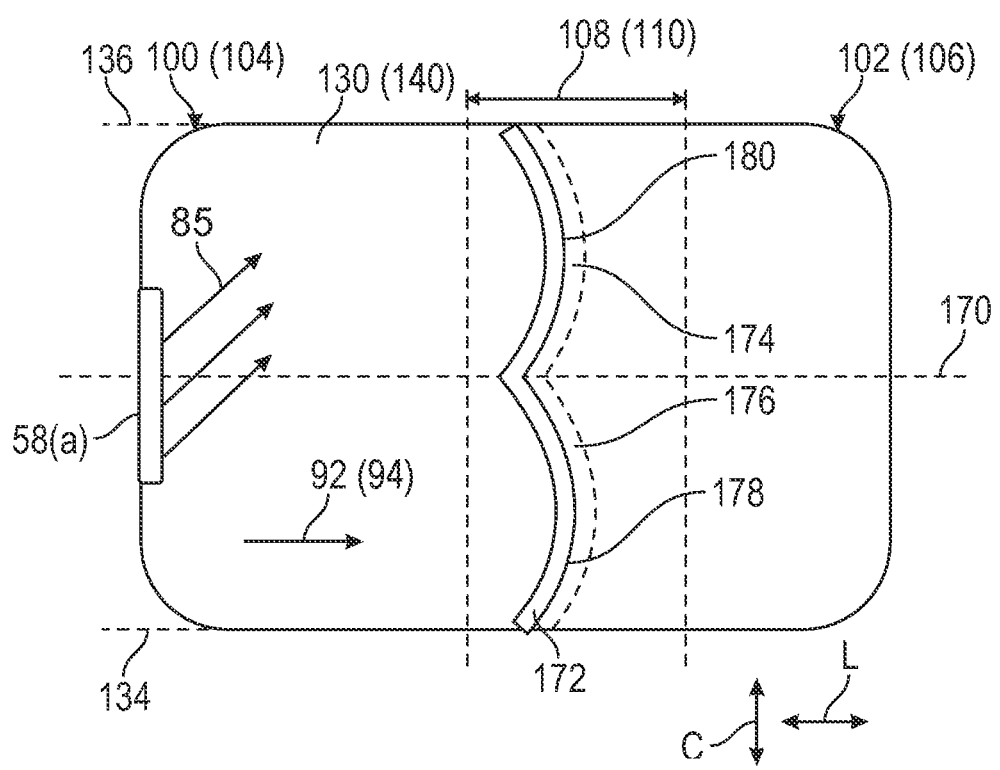
FIG. 8 depicts a plan view of a first segment outer liner, according to another aspect of the present disclosure.
Figure 9:
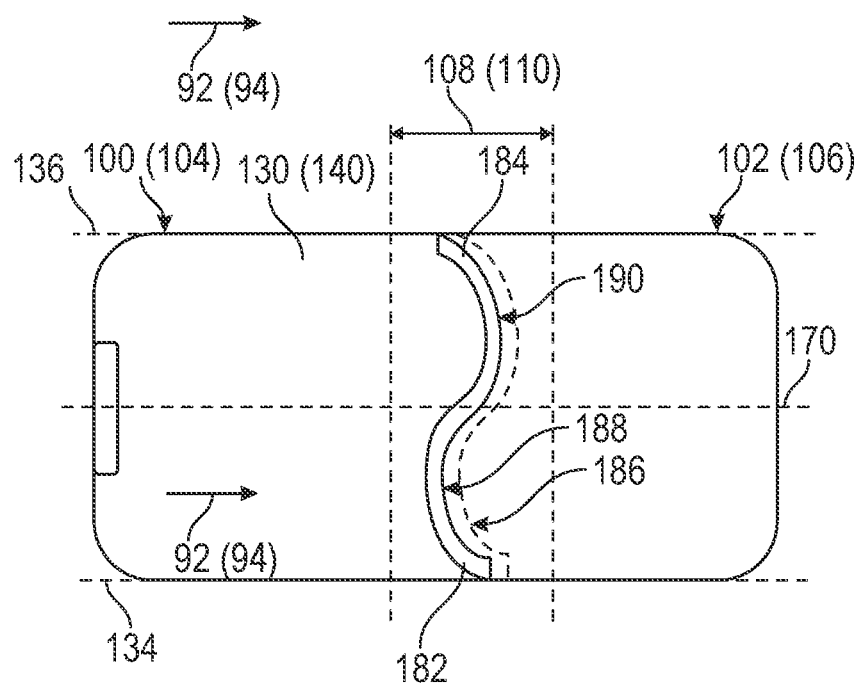
FIG. 9 depicts a plan view of a first segment outer liner, according to yet another aspect of the present disclosure.

FIG. 8 is a plan view of another first segment outer liner 130, taken at A-A in FIG. 4, according to another aspect of the present disclosure. In FIG. 8, the first segment outer liner 130 defines a first segment centerline 170 centered between the segment boundary line 134 and the segment boundary line 136. The FIG. 8 arrangement of the first segment slotted dilution opening includes multiple curved slot dilution openings connected together in the same segment. More particularly, the slotted dilution opening of FIG. 8 includes a first curved slot dilution opening 172 connected with a second curved slot dilution opening 174, extending in the circumferential direction (C) across the first segment outer liner 130 from the segment boundary line 134 to the segment boundary line 136. The first curved slot dilution opening 172 is seen to be a concave curved slot dilution opening, similar to the concave curved slot dilution opening 150, but extending from the segment boundary line 134 to the first segment centerline 170. Similarly, the second curved slot dilution opening 174 is seen to be a concave curved slot dilution opening similar to the concave curved slot dilution opening 150, but extends from the first segment centerline 170 to the segment boundary line 136. The first curved slot dilution opening 172 and the second curved slot dilution opening 174 are connected at the first segment centerline 170. A deflector wall 176 generally follows the contour of the downstream side 178 of the first curved slot dilution opening 172 and the downstream side 180 of the second curved slot dilution opening 174. It can be appreciated that, while the first curved slot dilution opening 172 and the second curved slot dilution opening 174 are shown as concave curved slot dilution openings with respect to the outer flow direction 92, they both may be convex curved slot dilution openings instead, similar to the convex curved slot dilution opening 156 of FIG. 6. Alternatively, as seen in FIG. 9, a first convex curved slot dilution opening 182 may be implemented in conjunction with a second concave curved slot dilution opening 184 within the first segment outer liner 130. A deflector wall 186 follows the contour of the downstream side 188 of the first convex curved slot dilution opening 182 and the downstream side 190 of the second concave curved slot dilution opening 184.

Figure 10:
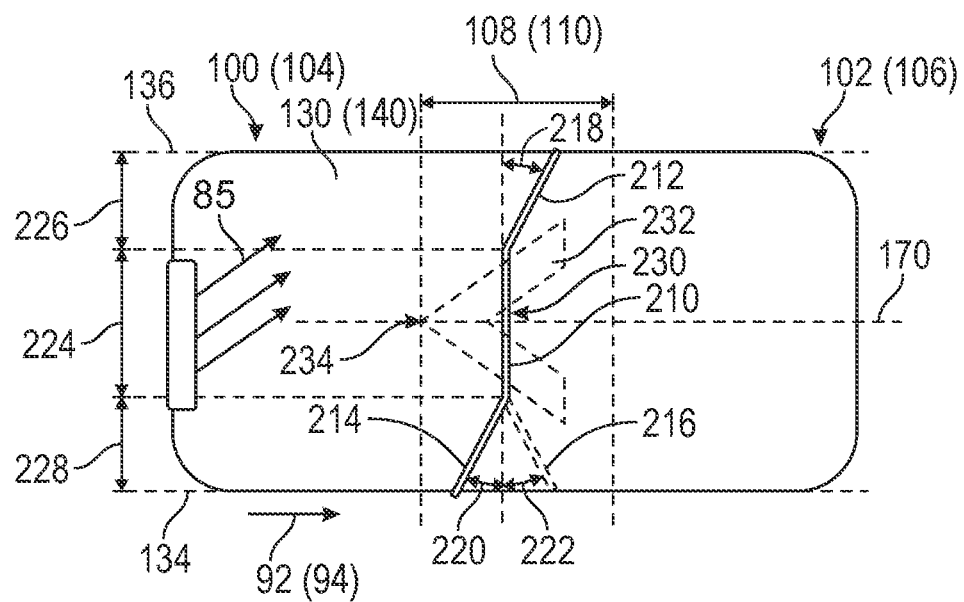
FIG. 10 depicts a plan view of a first segment outer liner, according to still another aspect of the present disclosure.

In each of the foregoing aspects, the slotted dilution opening was described as being a curved slot dilution opening. However, the slotted dilution opening may, instead, be formed of linear slot segments arranged in the circumferential direction. FIG. 10 depicts an example of a first segment outer liner 130 that includes linear slot segments. In FIG. 10, a linear slot dilution opening 230 is seen to include a linear slot dilution opening middle segment 210, a first linear slot dilution opening outer segment 212 and a second linear slot dilution opening outer segment 214. The linear slot dilution opening middle segment 210 may generally extend in the circumferential direction across a middle section 224 of the first segment outer liner 130. The first linear slot dilution opening outer segment 212 may extend across a first outer section 226 of the first segment outer liner 130 from the middle section 224 to the segment boundary line 136 of the first segment outer liner 130, and may extend both in the circumferential direction and axially downstream at an angle 218. The second linear slot dilution opening outer segment 214 may extend across a second outer section 228 of the first segment outer liner 130 from the middle section 224 to the segment boundary line 134 of the first segment outer liner 130, and may extend both in the circumferential direction and axially upstream at an angle 220. Alternatively, a second linear slot dilution opening outer segment 216 may be provided and may extend across the second outer section 228 of the first segment outer liner 130 from the middle section 224 to the segment boundary line 136 of the first segment outer liner 130, and may extend both in the circumferential direction and axially downstream at an angle 222.

While the linear slot dilution opening 230 is shown in FIG. 10 as extending circumferentially across the entirety of the first segment outer liner 130 from the segment boundary line 134 to the segment boundary line 136, the linear slotted dilution opening does not need to extend circumferentially across the entirety of the first segment outer liner 130. Rather, the linear slotted dilution opening may, for example, include only the linear slot dilution opening middle segment 210. In this aspect, the linear slot dilution opening middle segment 210 may take other forms than merely being a straight line extending circumferentially. For instance, the linear slot dilution opening middle segment 210 may instead form a V-shaped slotted dilution opening 232, with an apex 234 of the V-shaped slotted dilution opening 232 being on an upstream side of the V-shaped slotted dilution opening 232, as seen by the hidden lines. Of course, the V-shaped slotted dilution opening 232 may be inverted from that shown in FIG. 10.

Each of the foregoing arrangements of slotted dilution openings in FIGS. 4 to 10 generally result in a circumferentially continuous slotted dilution opening through the outer liner 54. That is, the slotted dilution opening extends circumferentially about the combustor centerline 112 through the outer liner 54 so as to result in the outer liner upstream section 206 and the outer liner downstream section 208, connected together with the circumferentially spaced bridge members 204. In contrast, the following description will present aspects of the present disclosure where the slotted dilution opening is not circumferentially continuous, but rather, is segment-based. In other words, the slotted dilution opening of one segment is not connected to the slotted dilution opening of an adjacent combustor liner segment.

Figure 11:
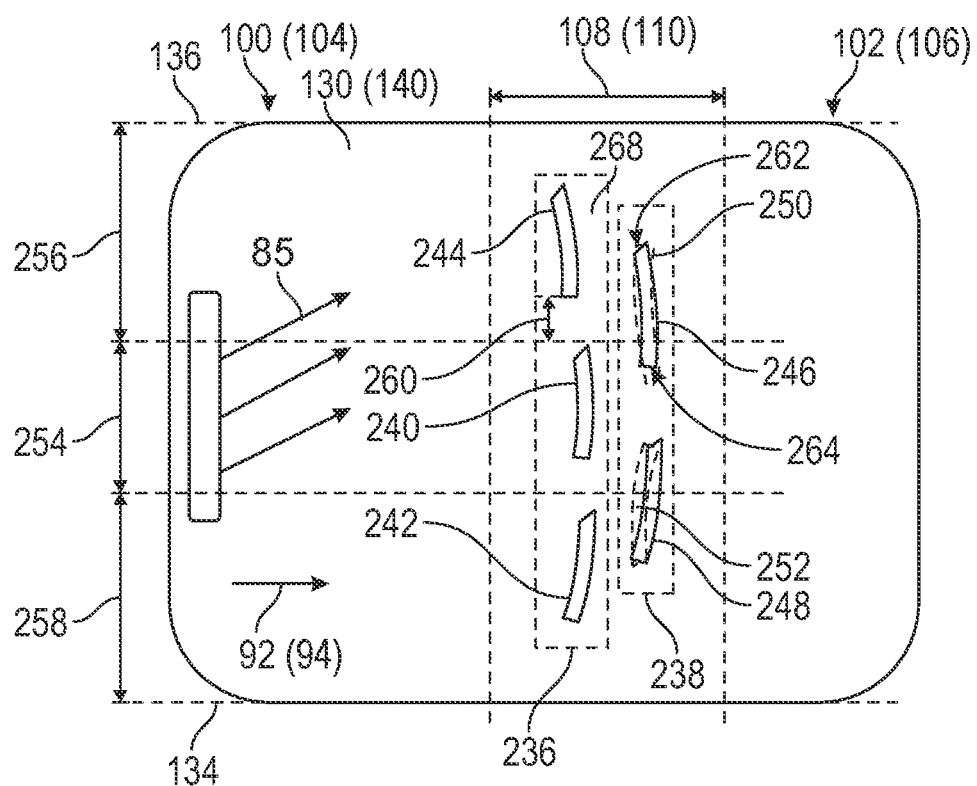
FIG. 11 depicts a plan view of a first segment outer liner, according to still yet another aspect of the present disclosure.

FIG. 11 depicts an exemplary first segment outer liner according to yet another aspect of the present disclosure. In FIG. 11, a plurality of rows of slotted dilution openings are provided through the first segment outer liner 130. A first row 236 includes a plurality of first row curved slot dilution openings 240, 242, and 244, and a second row 238, downstream of the first row 236, includes a plurality of second row curved slot dilution openings 246 and 248. Each of the first row curved slot dilution openings 240, 242, and 244 are shown as a concave curved slot dilution opening, with respect to the outer flow direction 92. Each of the second row curved slot dilution openings 246 and 248 are also shown as concave curved slot dilution openings, with respect to the outer flow direction 92. Of course, the first row curved slot dilution openings 240, 242, and 244 may be convex curved slot dilution openings instead of concave, and the second row curved slot dilution openings 246 and 248 may be concave curved slot dilution openings Alternatively, as seen in FIG. 11, the first row curved slot dilution openings 240, 242, and 244 may be concave curved slot dilution openings, while the second row 238 may include second row curved slot dilution openings 250 and 252 (shown with hidden lines) implemented as convex curved slot dilution openings While not shown in FIG. 11, each of the first row curved slot dilution openings 240, 242, and 244 may include a respective deflector wall extending into the combustion chamber 62 at their downstream side, and each of the second row curved slot dilution openings 250 and 252 may also include a respective deflector wall extending into the combustion chamber at their respective downstream sides.

In addition, as seen in FIG. 11, the first row curved slot dilution openings 240, 242, and 244, may be spaced apart from one another in the circumferential direction, and the second row curved slot dilution openings 250 and 252 may also be spaced apart from one another in the circumferential direction. For example, the first row curved slot dilution opening 240 may be implemented in a middle section 254 of the first segment outer liner 130, the first row curved slot dilution opening 242 may be implemented in a first outer section 258 disposed between the middle section 254 and the segment boundary line 134, and the first row curved slot dilution opening 244 may be implemented in a second outer section 256 between the middle section 254 and the segment boundary line 136. A spacing distance 260 between, for example, the first row curved slot dilution opening 240 and the first row curved slot dilution opening 244, may be set based on a desired amount dilution air flow to be provided from the outer flow passage 88 to the dilution zone 72 of the combustion chamber 62.

Additionally, each of the curved slot dilution openings of the second row may be circumferentially offset (or staggered) with respect to the first row curved slot dilution openings. For example, as shown in FIG. 11, the second row curved slot dilution opening 246 may be arranged to extend from the middle section 254 into the second outer section 256 so that a first end 262 of the second row curved slot dilution opening 246 overlaps circumferentially with the first row curved slot dilution opening 244, and a second end 264 of the second row curved slot dilution opening 246 overlaps circumferentially with the first row curved slot dilution opening 240.

As seen in FIG. 12, is an arrangement of slotted dilution openings between segments of the outer liner, according to another aspect of the present disclosure. In FIG. 12, a concave curved slot dilution opening 265 is included in the first segment outer liner 130, and a concave curved slot dilution opening 267 is included in the second segment outer liner 132. Unlike the concave curved slot dilution opening 150 of FIG. 6, which extends circumferentially across the entirety of the first segment outer liner 130 from the segment boundary line 134 to the segment boundary line 136, the concave curved slot dilution opening 265 of FIG. 11 does not extend the full distance between the segment boundary line 134 and the segment boundary line 136. Rather, a first gap 272 is defined between a first end 268 of the concave curved slot dilution opening 265 and the segment boundary line 136. Similarly, a second gap 274 is defined between a second end 270 of the concave curved slot dilution opening 265 and the segment boundary line 134. With the FIG. 12 implementation, to achieve a circumferentially continuous slotted dilution opening about the outer liner 54, an outer liner connecting dilution opening 266 is provided to connect the concave curved slot dilution opening 265 of the first segment outer liner 130 with the concave curved slot dilution opening 267 of the second segment outer liner 132. The outer liner connecting dilution opening 266 is shown in FIG. 12 as a generally linear slotted dilution opening extending in the circumferential direction. As with the previous aspects, the concave curved slot dilution opening 265 and the concave curved slot dilution opening 267 each includes a deflector wall (not shown) along the contour of their respective downstream sides. The outer liner connecting dilution opening 266 may also include a deflector wall (not shown), or the deflector wall may be omitted from the outer liner connecting dilution opening 266. Of course, the concave curved slot dilution opening 265 and the concave curved slot dilution opening 267 could be implemented with both being convex curved slot dilution openings (not shown) instead, or one could be concave as shown in FIG. 11 and the other convex (not shown).

FIG. 13 depicts another arrangement of slotted dilution openings between segments of the outer liner, according to still another aspect of the present disclosure. The FIG. 13 arrangement is somewhat similar to the FIG. 12 arrangement, but, in FIG. 13, a convex curved slot connecting dilution opening 276 is implemented between the first segment outer liner 130 and the second segment outer liner 132. With the FIG. 13 arrangement, a radius of the concave curved slot dilution opening 265 may be smaller than that of the concave curved slot dilution opening 265 of FIG. 12. As such, the first gap 272 between the segment boundary line 136 and the first end 268 of the concave curved slot dilution opening 265 may be greater than that of FIG. 12, and the second gap 274 between the segment boundary line 134 and the second end 270 of the concave curved slot dilution opening 265 may be greater than that of FIG. 12. With the implementation of the convex curved slot connecting dilution opening 276, a sine wave type continuous dilution opening may be formed through the outer liner 54 about its entire circumference. Again, while not shown in FIG. 13, each respective curved slot dilution opening may include a respective deflector wall along the contour of their respective downstream sides.

Figure 14:
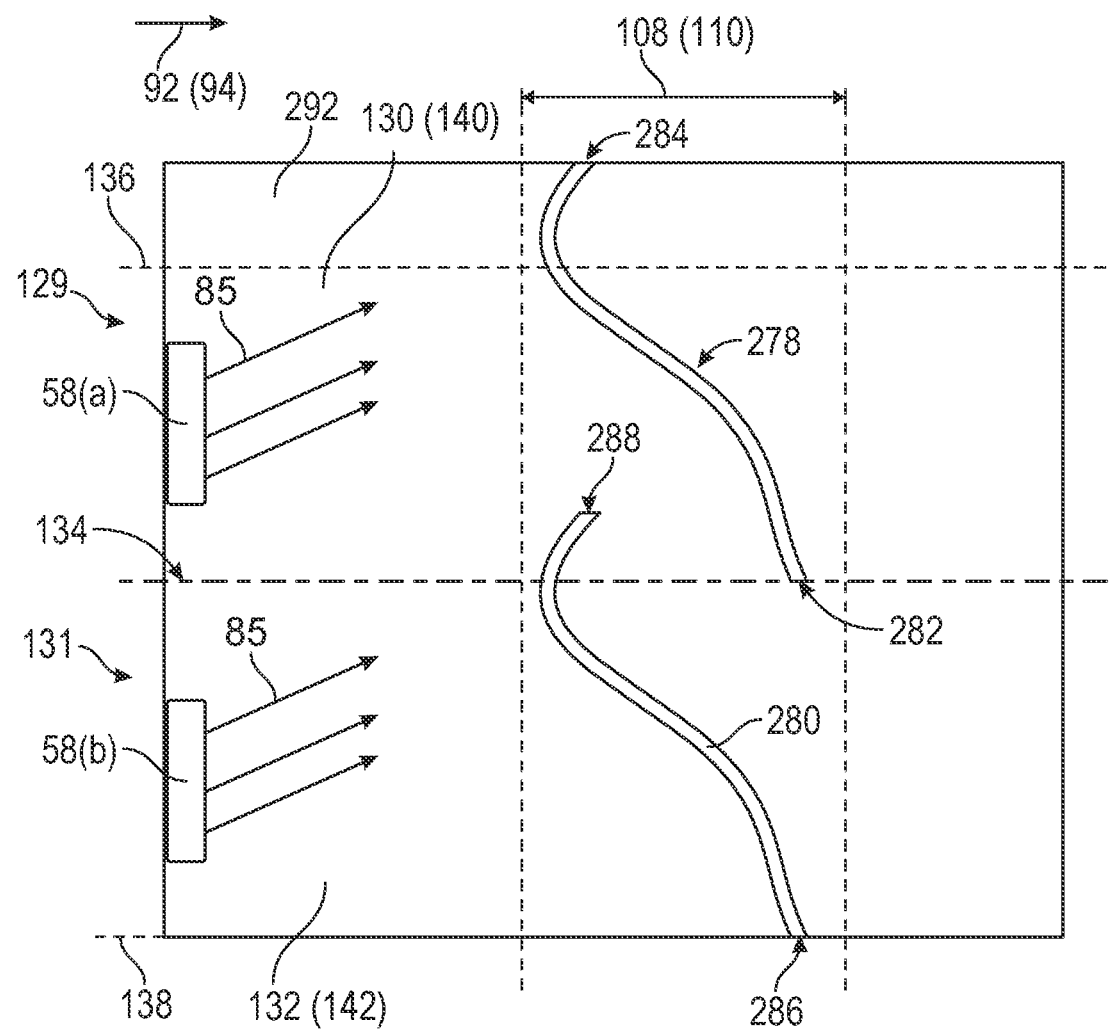
FIG. 14 depicts a plan view of a first segment outer liner and a second segment outer liner connection, according to still another aspect of the present disclosure.

FIG. 14 depicts yet another arrangement of slotted dilution openings between segments of the outer liner, according to still yet another aspect of the present disclosure. In FIG. 14, an arrangement of slotted dilution openings is implemented so as to provide for a single piece outer liner (i.e., an outer liner that does not require the bridge member 204 to connect an upstream section and a downstream section of the outer liner), unlike the aspects of FIGS. 12 and 13 where the slotted dilution opening is a circumferentially continuous slotted opening about the entire circumference of the outer liner 54. In FIG. 14, the first segment outer liner 130 may include a generally S-shaped slotted dilution opening 278, where a first end 282 of the S-shaped slotted dilution opening 278 may begin at the segment boundary line 134, and a second end 284 of the S-shaped slotted dilution opening 278 may extend across the segment boundary line 136 into a third segment outer liner 292 of a third segment 290 (FIG. 3) adjacent to the first segment outer liner 130. Similarly, the second segment outer liner 132 is seen to include an S-shaped slotted dilution opening 280, where a first end 286 of the S-shaped slotted dilution opening 280 begins at the segment boundary line 138 and a second end 288 extends across the segment boundary line 134 into the first segment outer liner 130. The second end 288 of the S-shaped slotted dilution opening 280 may be disposed upstream of the first end 282 of the S-shaped slotted dilution opening 278 if the first segment outer liner 130 so as to offset the S-shaped slotted dilution opening 278 and the S-shaped slotted dilution opening 280.

Figure 15:
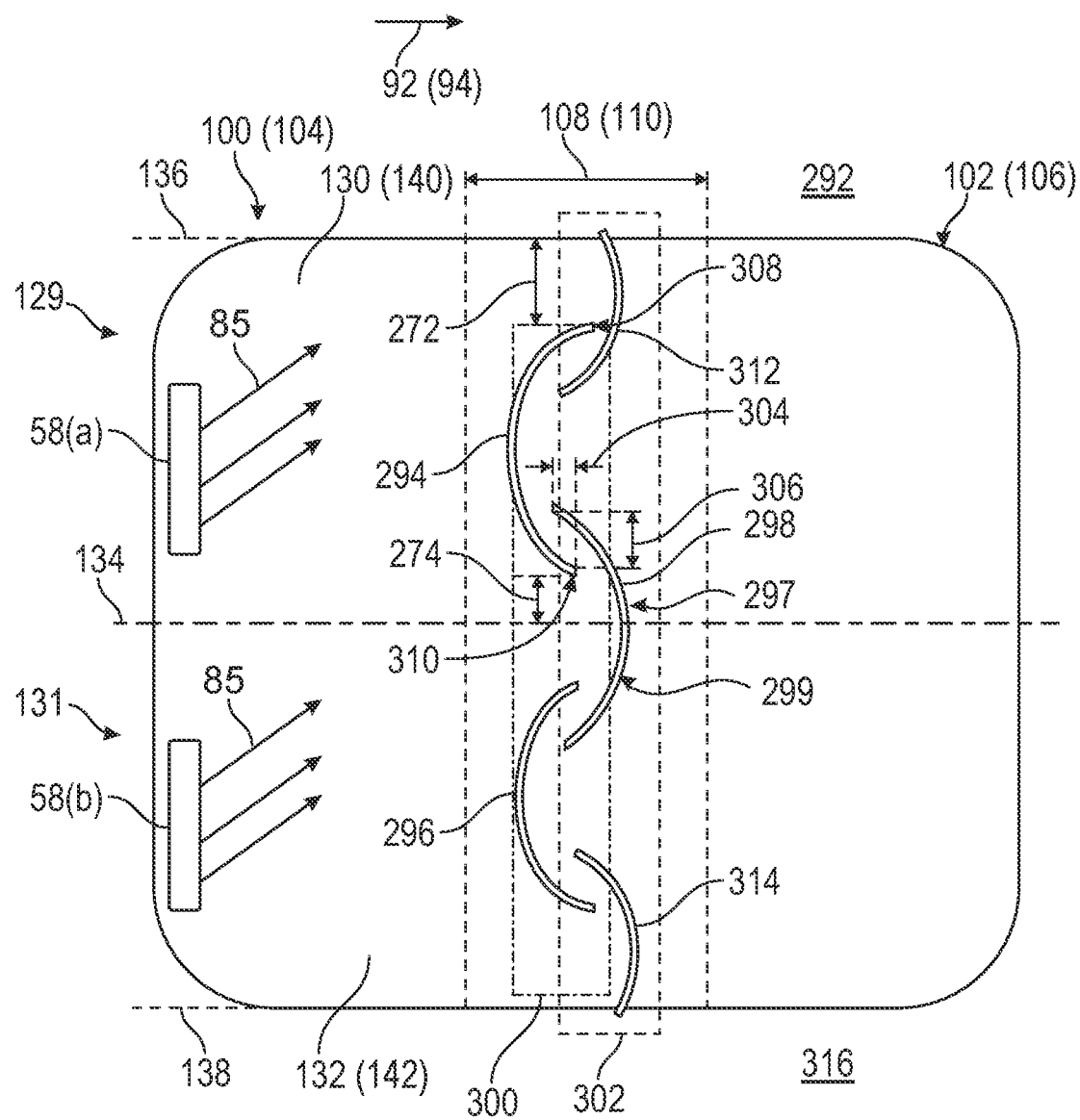
FIG. 15 depicts a plan view of a first segment outer liner and a second segment outer liner connection, according to yet another aspect of the present disclosure.

FIG. 15 depicts another arrangement of slotted dilution openings between segments of the outer liner, according to still yet another aspect of the present disclosure. The arrangement of FIG. 15, like the arrangement of FIG. 14, depicts another example of discontinuous slotted dilution openings between segments so as to provide for a single piece outer liner 54. In FIG. 15, the first segment outer liner 130 is seen to include a first segment convex curved slot dilution opening 294 and the second segment outer liner 132 is seen to include a second segment convex curved slot dilution opening 296. The first segment convex curved slot dilution opening 294 may be centrally located between the segment boundary line 134 and the segment boundary line 136. For example, the first gap 272 between the segment boundary line 136 and a first end 308 of the first segment convex curved slot dilution opening 294 may be the same as the second gap 274 between the segment boundary line 134 and a second end 310 of the first segment convex curved slot dilution opening 294. A similar alignment is provided for the second segment convex curved slot dilution opening 296 with respect to the segment boundary line 134 and the segment boundary line 138. Circumferentially, the first segment convex curved slot dilution opening 294 and the second segment convex curved slot dilution opening 296 are seen to be arranged in a first row 300.

An outer liner concave curved slot connecting dilution opening 298 is provided between the first segment outer liner 130 and the second segment outer liner 132. As seen in FIG. 15, the outer liner concave curved slot connecting dilution opening 298 is provided in a second row 302 and includes a first portion 297 that is provided in the first combustor liner segment 129 and a second portion 299 that is provided in the second combustor liner segment 131. The second row 302 also includes an outer liner concave curved slot connecting dilution opening 312 that connects the first segment outer liner 130 with the adjacent third segment outer liner 292. The second row 302 further includes an outer liner concave curved slot connecting dilution opening 314 that connects the second segment outer liner 132 with an adjacent fourth segment outer liner 316 (see FIG. 3). As shown in FIG. 15, while the first segment convex curved slot dilution opening 294 and the second segment convex curved slot dilution opening 296 are provided in the first row 300, and the outer liner concave curved slot connecting dilution opening 298 is provided in the second row 302, the dilution openings of the first row 300 and the dilution openings of the second row 302 overlap one another both circumferentially and axially. For example, the first segment convex curved slot dilution opening 294 and the outer liner concave curved slot connecting dilution opening 298 overlap one another axially in an axial overlap region 304, and they also overlap one another circumferentially in a circumferential overlap region 306. A similar axial and circumferential overlap is provided between the second segment convex curved slot dilution opening 296 and the outer liner concave curved slot connecting dilution opening 298. While not shown in FIG. 15, a respective deflector wall may be provided for each of the dilution openings. Alternatively, a deflector wall may be provided for the dilution openings in the second row 302, but not for the dilution openings in the first row 300.

While the foregoing description relates generally to a gas turbine engine, it can readily be understood that the gas turbine engine may be implemented in various environments. For example, the engine may be implemented in an aircraft, but may also be implemented in non-aircraft applications such as power generating stations, marine applications, or oil and gas production applications. Thus, the present disclosure is not limited to use in aircraft.

Further aspects of the present disclosure are provided by the subject matter of the following clauses.

A combustor liner for a combustor of a gas turbine, the combustor liner comprising: an outer liner comprising a plurality of outer liner segments connected together so as to extend annularly about a combustor centerline, each segment of the plurality of outer liner segments including at least one outer liner slotted dilution opening therethrough in an outer liner dilution zone, each outer liner slotted dilution opening extending in a circumferential direction and including an outer liner deflector wall adjacent to a downstream side of the outer liner slotted dilution opening; and an inner liner comprising a plurality of inner liner segments connected together so as to extend annularly about the combustor centerline, each segment of the plurality of inner liner segments including at least one inner liner slotted dilution opening therethrough in an inner liner dilution zone, each inner liner slotted dilution opening extending in the circumferential direction, and including an inner liner deflector wall adjacent to a downstream side of the inner liner slotted dilution opening.

The combustor liner according to any preceding clause, wherein the combustor liner defines an axial direction along the combustor centerline, a radial direction extending from the combustor centerline, and the circumferential direction extending circumferentially about the combustor centerline, each segment of the plurality of outer liner segments having an outer liner cold surface side and an outer liner hot surface side, and defining an outer flow direction extending in the axial direction from an outer liner upstream end to an outer liner downstream end, the outer liner dilution zone being between the outer liner upstream end and the outer liner downstream end, and the outer liner deflector wall extending in the radial direction radially inward from the outer liner hot surface side, and each segment of the plurality of inner liner segments having an inner liner cold surface side and an inner liner hot surface side, and defining an inner liner flow direction extending in the axial direction from an inner liner upstream end to an inner liner downstream end, the inner liner dilution zone being between the inner liner upstream end and the inner liner downstream end, and each inner liner deflector wall extending in the radial direction radially outward from the inner liner hot surface side.

The combustor liner according to any preceding clause, wherein the at least one outer liner slotted dilution opening comprises a plurality of outer liner linear slotted segments extending in the circumferential direction, and the at least one inner liner slotted dilution opening comprises a plurality of inner liner linear slotted segments extending in the circumferential direction.

The combustor liner according to any preceding clause, wherein each outer liner deflector wall extends radially inward from the outer liner hot surface side at an outer liner deflector wall angle with respect to the radial direction and the axial direction, and each inner liner deflector wall extends radially outward from the inner liner hot surface side at an inner liner deflector wall angle.

The combustor liner according to any preceding clause, wherein the at least one outer liner slotted dilution opening comprises at least one outer liner curved slot dilution opening, and the at least one inner liner slotted dilution opening comprises at least one inner liner curved slot dilution opening.

The combustor liner according to any preceding clause, wherein at least one outer liner curved slot dilution opening is an outer liner concave curved slot dilution opening, with respect to the outer flow direction, and the at least one inner liner curved slot dilution opening is an inner liner concave curved slot dilution opening, with respect to the inner liner flow direction.

The combustor liner according to any preceding clause, wherein the at least one outer liner curved slot dilution opening is an outer liner convex curved slot dilution opening, with respect to the outer flow direction, and the at least one inner liner curved slot dilution opening is an inner liner convex curved slot dilution opening, with respect to the inner liner flow direction.

The combustor liner according to any preceding clause, wherein, in a first outer liner segment among the plurality of outer liner segments, the outer liner curved slot dilution opening comprises a first segment outer liner convex curved slot dilution opening, with respect to the outer flow direction, and a first portion of an outer liner concave curved slot connecting dilution opening, with respect to the outer flow direction, the first portion of the outer liner concave curved slot connecting dilution opening being axially downstream of the first segment outer liner convex curved slot dilution opening, circumferentially overlapping the first segment outer liner convex curved slot dilution opening, and extending to a boundary between the first outer liner segment and a second outer liner segment adjacent to the first outer liner segment, and, in the second outer liner segment, the outer liner curved slot dilution opening comprises a second segment outer liner convex curved slot dilution opening, with respect to the outer liner flow direction, and a second portion of the outer liner concave curved slot connecting dilution opening, with respect to the outer liner flow direction, the second portion of the outer liner concave curved slot connecting dilution opening being axially downstream of the second segment outer liner convex curved slot dilution opening, circumferentially overlapping with the second segment outer liner convex curved slot dilution opening, and extending to the boundary between the first outer liner segment and the second outer liner segment and connecting with the first portion of the outer liner concave curved slot connecting dilution opening, and wherein, in a first inner liner segment among the plurality of inner liner segments, the inner liner curved slot dilution opening comprises a first segment inner liner convex curved slot dilution opening, with respect to the inner liner flow direction, and a first portion of an inner liner concave curved slot connecting dilution opening, with respect to the inner liner flow direction, the first portion of the inner liner concave curved slot connecting dilution opening being axially downstream of the first segment inner liner convex curved slot dilution opening, circumferentially overlapping the first segment inner liner convex curved slot dilution opening, and extending to a boundary between the first inner liner segment and a second inner liner segment adjacent to the first inner liner segment, and in the second inner liner segment, the inner liner curved slot dilution opening comprises a second segment inner liner convex curved slot dilution opening, with respect to the inner liner flow direction, and a second portion of the inner liner concave curved slot connecting dilution opening, with respect to the inner liner flow direction, the second portion of the inner liner concave curved slot connecting dilution opening being axially downstream of the second segment inner liner convex curved slot dilution opening, circumferentially overlapping with the second segment inner liner convex curved slot dilution opening, and extending to the boundary between the first inner liner segment and the second inner liner segment and connecting with the first portion of the inner liner concave curved slot connecting dilution opening.

The combustor liner according to any preceding clause, wherein, with respect to the circumferential direction, a second end of the outer liner curved slot dilution opening is arranged axially downstream of a first end of the outer liner curved slot dilution opening, opposite the second end of the outer liner curved slot dilution opening, and with respect to the circumferential direction, a second end of the inner liner curved slot dilution opening is arranged axially downstream of a first end of the inner liner curved slot dilution opening, opposite the second end of the inner liner curved slot dilution opening.

The combustor liner according to any preceding clause, wherein, in a first outer liner segment and a second outer liner segment among the plurality of outer liner segments, the outer liner curved slot dilution opening of the first outer liner segment comprises a first segment outer liner curved slot dilution opening and includes a first end and a second end opposite the first end in the circumferential direction, the second end extending across a boundary between the first outer liner segment and the second outer liner segment, and the outer liner curved slot dilution opening of the second outer liner segment comprises a second segment outer liner curved slot dilution opening and includes a third end and a fourth end opposite the third end in the circumferential direction, the second end of the first segment outer liner curved slot dilution opening being arranged upstream of the third end of the second segment outer liner curved slot dilution opening, and the first segment outer liner curved slot dilution opening overlapping with the second segment outer liner curved slot dilution opening in the circumferential direction at the second end and the third end.

The combustor liner according to any preceding clause, wherein the at least one outer liner curved slot dilution opening comprises a plurality of outer liner curved slot dilution openings arranged adjacent to one another in the circumferential direction, and the at least one inner liner curved slot dilution opening comprises a plurality of inner liner curved slot dilution openings arranged adjacent to one another in the circumferential direction.

The combustor liner according to any preceding clause, wherein a first one of the plurality of outer liner curved slot dilution openings and a second one of the plurality of outer liner curved slot dilution openings each comprises an outer liner concave curved slot dilution opening, with respect to the outer flow direction, and a first one of the plurality of inner liner curved slot dilution openings and a second one of the plurality of inner liner curved slot dilution openings each comprises an inner liner concave curved slot dilution opening, with respect to the inner liner flow direction.

The combustor liner according to any preceding clause, wherein a first one of the plurality of outer liner curved slot dilution openings comprises an outer liner concave curved slot dilution opening, with respect to the outer flow direction, and a second one of the plurality of outer liner curved slot dilution openings comprises an outer liner convex curved slot dilution opening, with respect to the outer flow direction, and a first one of the plurality of inner liner curved slot dilution openings comprises an inner liner concave curved slot dilution opening, with respect to the inner liner flow direction, and a second one of the plurality of inner liner curved slot dilution openings comprises an inner liner convex curved slot dilution opening, with respect to the inner liner flow direction.

The combustor liner according to any preceding clause, wherein, in a first outer liner segment among the plurality of outer liner segments, the outer liner curved slot dilution opening is a first segment outer liner concave curved slot dilution opening, with respect to the outer flow direction, and, in a second outer liner segment among the plurality of outer liner segments, adjacent to the first outer liner segment, the outer liner curved slot dilution opening is a second segment outer liner concave curved slot dilution opening, with respect to the outer flow direction, and an outer liner connecting dilution opening connects the first segment outer liner concave curved slot dilution opening with the second segment outer liner concave curved slot dilution opening, and in a first inner liner segment among the plurality of inner liner segments, the inner liner curved slot dilution opening is a first segment inner liner concave curved slot dilution opening, with respect to the outer liner flow direction, and in a second inner liner segment among the plurality of inner liner segments, adjacent to the first inner liner segment, the inner liner curved slot dilution opening is a second segment inner liner concave curved slot dilution opening, with respect to the inner liner flow direction, and an inner liner connecting dilution opening connects the first segment inner liner concave curved slot dilution opening with the second segment inner liner concave curved slot dilution opening.

The combustor liner according to any preceding clause, wherein the outer liner connecting dilution opening is a linear slot connecting dilution opening extending in the circumferential direction, and the inner liner connecting dilution opening is a linear slot connecting dilution opening extending in the circumferential direction.

The combustor liner according to any preceding clause, wherein the outer liner connecting dilution opening includes an outer liner connector deflector wall extending radially inward from the outer liner hot surface side adjacent to a downstream side of the outer liner connecting dilution opening, and the inner liner connecting dilution opening includes an inner liner connector deflector wall extending radially outward from the inner liner hot surface side adjacent to a downstream side of the inner liner connecting dilution opening.

The combustor liner according to any preceding clause, wherein the outer liner connecting dilution opening is a convex curved slot dilution opening, with respect to the outer flow direction, and the inner liner connecting dilution opening is a convex curved slot dilution opening, with respect to the inner liner flow direction.

The combustor liner according to any preceding clause, wherein the outer liner curved slot dilution opening comprises a plurality of rows of outer liner curved slot dilution openings, a first row of outer liner curved slot dilution openings among the plurality of rows of outer liner curved slot dilution openings being arranged axially upstream of a second row of outer liner curved slot dilution openings, and the first row of outer liner curved slot dilution openings comprises a plurality of first row outer liner curved slot dilution openings arranged adjacent to one another in the circumferential direction, and the second row of outer liner curved slot dilution openings comprises a plurality of second row outer liner curved slot dilution openings arranged adjacent to one another in the circumferential direction, and wherein the inner liner curved slot dilution opening comprises a plurality of rows of inner liner curved slot dilution openings, a first row of inner liner curved slot dilution openings among the plurality of rows of inner liner curved slot dilution openings being arranged axially upstream of a second row of inner liner curved slot dilution openings, and the first row of inner liner curved slot dilution openings comprises a plurality of first row inner liner curved slot dilution openings arranged adjacent to one another in the circumferential direction, and the second row of inner liner curved slot dilution openings comprises a plurality of second row inner liner curved slot dilution openings arranged adjacent to one another in the circumferential direction.

The combustor liner according to any preceding clause, wherein each first row outer liner curved slot dilution opening among the plurality of first row outer liner curved slot dilution openings is a concave curved slot dilution opening with respect to the outer flow direction, and each second row outer liner curved slot dilution opening among the plurality of second row outer liner curved slot dilution openings is a concave curved slot dilution opening, each second row outer liner curved slot dilution opening being circumferentially staggered with respect to each first row outer liner curved slot dilution opening, and wherein each first row inner liner curved slot dilution opening among the plurality of first row inner liner curved slot dilution openings is a concave curved slot dilution opening with respect to the inner liner flow direction, and each second row inner liner curved slot dilution opening among the plurality of second row inner liner curved slot dilution openings is a concave curved slot dilution opening, each second row inner liner curved slot dilution opening being circumferentially staggered with respect to each first row inner liner curved slot dilution opening.

The combustor liner according to any preceding clause, wherein each first row outer liner curved slot dilution opening among the plurality of first row outer liner curved slot dilution openings is a convex curved slot dilution opening with respect to the outer flow direction, and each second row outer liner curved slot dilution opening among the plurality of second row outer liner curved slot dilution openings is a concave curved slot dilution opening, each second row outer liner curved slot dilution opening being circumferentially staggered with respect to each first row outer liner curved slot dilution opening, and wherein each first row inner liner curved slot dilution opening among the plurality of first row inner liner curved slot dilution openings is a convex curved slot dilution opening with respect to the inner liner flow direction, and each second row inner liner curved slot dilution opening among the plurality of second row inner liner curved slot dilution openings is a concave curved slot dilution opening, each second row inner liner curved slot dilution opening being circumferentially staggered with respect to each first row inner liner curved slot dilution opening.

Although the foregoing description is directed to some exemplary embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. A combustor liner for a combustor of a gas turbine, the combustor liner defining an axial direction along a combustor centerline, a radial direction extending from the combustor centerline, and a circumferential direction extending circumferentially about the combustor centerline, the combustor liner comprising:
a liner segment defining a flow direction extending in the axial direction from an upstream end of the liner segment to a downstream end of the liner segment, a dilution zone being defined between the upstream end of the liner segment and the downstream end of the liner segment, the liner segment having a cold surface side and a hot surface side and including a curved slot dilution opening arranged in the dilution zone and having, with respect to the flow direction, a concave curved slot dilution opening portion and a convex curved slot dilution opening portion arranged adjacent to one another in the circumferential direction, and including a liner deflector wall adjacent to a downstream side of the curved slot dilution opening and extending radially inward from the hot surface side of the liner segment,
wherein the liner deflector wall includes a convex deflector wall portion arranged at a downstream side of the convex curved slot dilution opening portion, and a concave deflector wall portion arranged at a downstream side of the concave curved slot dilution opening portion.

2. The combustor liner according to claim 1, wherein the liner segment further defines a liner segment centerline extending from the upstream end of the liner segment to the downstream end of the liner segment, and the concave curved slot dilution opening portion is arranged on a first circumferential side of the liner segment centerline and the convex curved slot dilution opening portion is arranged on a second circumferential side of the liner segment centerline.

3. The combustor liner according to claim 2, wherein the liner segment further defines a first liner segment boundary on a first circumferential side of the liner segment, and a second liner segment boundary on a second circumferential side of the liner segment.

4. The combustor liner according to claim 3, wherein a first end of the convex curved slot dilution opening portion is arranged adjacent to the first liner segment boundary and a second end of the convex curved slot dilution opening portion is arranged adjacent to the liner segment centerline, and a first end of the concave curved slot dilution opening portion is arranged adjacent to the liner segment centerline and a second end of the concave curved slot dilution opening portion is arranged adjacent to the second liner segment boundary.

5. The combustor liner according to claim 4, wherein the liner deflector wall extends continuously along from the first end of the convex curved slot dilution opening portion to the second end of the concave curved slot dilution opening portion.

6. The combustor liner according to claim 1, wherein the combustor liner includes a plurality of liner segments connected together annularly about the combustor centerline to define an annular combustor liner.

7. The combustor liner according to claim 6, wherein the combustor liner includes a first annular combustor liner defining an outer combustor liner, and a second annular combustor liner defining an inner combustor liner, the outer combustor liner being arranged radially outward of the inner combustor liner with respect to the combustor centerline.

8. A combustor for a gas turbine engine, the combustor defining a combustor centerline axis, an axial direction extending along the combustor centerline axis, a radial direction extending from the combustor centerline axis, and a circumferential direction extending circumferentially about the combustor centerline axis, the combustor comprising:
an outer liner;
an outer casing arranged radially outward of the outer liner, an outer flow passage being defined between the outer liner and the outer casing;
an inner liner;
an inner casing arranged radially inward of the inner liner, an inner flow passage being defined between the inner liner and the inner casing;
a dome structure connecting the outer liner and the inner liner, a combustion chamber being defined between the outer liner, the inner liner, and the dome structure; and
a plurality of swirler assemblies connected to the dome structure,
wherein at least one of the outer liner or the inner liner comprises a plurality of liner segments connected together so as to extend annularly about the combustor centerline axis, at least one liner segment of the plurality of liner segments defining a flow direction extending in the axial direction from an upstream end of the at least one liner segment to a downstream end of the at least one liner segment, a dilution zone being defined between the upstream end of the at least one liner segment and the downstream end of the at least one liner segment, the at least one liner segment having a cold surface side and a hot surface side adjacent to the combustion chamber, and including a curved slot dilution opening arranged in the dilution zone, the curved slot dilution opening having, with respect to the flow direction, a concave curved slot dilution opening portion and a convex curved slot dilution opening portion arranged adjacent to one another in the circumferential direction, and including a liner deflector wall adjacent to a downstream side of the curved slot dilution opening and extending radially inward from the hot surface side of the at least one liner segment, and
wherein the liner deflector wall includes a convex deflector wall portion arranged at a downstream side of the convex curved slot dilution opening portion, and a concave deflector wall portion arranged at a downstream side of the concave curved slot dilution opening portion.

9. The combustor according to claim 8, wherein each liner segment of the plurality of liner segments further defines a liner segment centerline extending from the upstream end of the at least one liner segment to the downstream end of the at least one liner segment, and the concave curved slot dilution opening portion is arranged on a first circumferential side of the liner segment centerline and the convex curved slot dilution opening portion is arranged on a second circumferential side of the liner segment centerline.

10. The combustor according to claim 9, wherein the at least one liner segment further defines a first liner segment boundary on a first circumferential side of the at least one liner segment, and a second liner segment boundary on a second circumferential side of the at least one liner segment.

11. The combustor according to claim 10, wherein a first end of the convex curved slot dilution opening portion is arranged adjacent to the first liner segment boundary and a second end of the convex curved slot dilution opening portion is arranged adjacent to the liner segment centerline, and a first end of the concave curved slot dilution opening portion is arranged adjacent to the liner segment centerline and a second end of the concave curved slot dilution opening portion is arranged adjacent to the second liner segment boundary.

12. The combustor according to claim 11, wherein the liner deflector wall extends continuously along from the first end of the convex curved slot dilution opening portion to the second end of the concave curved slot dilution opening portion.

13. The combustor according to claim 9, wherein the liner segment centerline is circumferentially aligned with a center of one of the plurality of swirler assemblies.

14. The combustor according to claim 9, wherein the outer liner comprises the plurality of liner segments and includes the at least one liner segment.

15. The combustor according to claim 14, wherein each segment of the plurality of liner segments of the outer liner includes the at least one liner segment.

16. The combustor according to claim 14, wherein, in operation of the combustor, a flow of dilution air is provided through the curved slot dilution opening from the outer flow passage into the combustion chamber.

17. The combustor according to claim 9, wherein the inner liner comprises the plurality of liner segments and includes the at least one liner segment.

18. The combustor according to claim 17, wherein, in operation of the combustor, a flow of dilution air is provided through the curved slot dilution opening from the inner flow passage into the combustion chamber.

\* \* \* \* \*